United States Patent [19]

Komori et al.

[11] Patent Number: 5,141,995

[45] Date of Patent: Aug. 25, 1992

[54] MODIFIED PROPYLENE POLYMER COMPOSITION AND PROCESS OF MAKING COMPOSITION

[75] Inventors: Nobutoshi Komori; Hirokazu Nakajima, both of Ichiharashi, Japan

[73] Assignee: Chisso Corporation, Tokyo, Japan

[21] Appl. No.: 832,048

[22] Filed: Feb. 6, 1992

Related U.S. Application Data

[63] Continuation of Ser. No. 551,173, Jul. 11, 1990, which is a continuation of Ser. No. 244,154, Sep. 14, 1988, abandoned, which is a continuation-in-part of Ser. No. 37,725, Apr. 13, 1987, abandoned.

[30] Foreign Application Priority Data

Apr. 25, 1986 [JP] Japan .................. 61-96019
Jul. 4, 1986 [JP] Japan .................. 61-157315

[51] Int. Cl.$^5$ .............................................. C08F 4/00
[52] U.S. Cl. .................................... 525/242; 525/303; 525/333.7; 525/333.8; 525/384
[58] Field of Search ................ 525/242, 303, 333.7, 525/333.8, 384

[56] References Cited

U.S. PATENT DOCUMENTS 4,316,971  2/1982  Rim et al. .................. 525/310

FOREIGN PATENT DOCUMENTS 50-63045  5/1975  Japan .

Primary Examiner—Joseph L. Schofer
Assistant Examiner—Peter D. Mulcahy
Attorney, Agent, or Firm—Fred Philpitt

[57] ABSTRACT

A modified propylene polymer having superior coloring-prevention properties is provided by a process which comprises blending a propylene polymer with (A) a polyol or a fatty acid partial ester of the polyol (B) a phenolic antioxidant and (C) a radical generating agent with a propylene polymer containing 5 ppm or more of titanium or 0.5 ppm or more of vanadium as a catalyst residue and subjecting the resultant blend to a melting and kneading treatment at a temperature of 150° C.–300° C.

20 Claims, No Drawings

MODIFIED PROPYLENE POLYMER COMPOSITION AND PROCESS OF MAKING COMPOSITION

This is a continuation of application Ser. No. 07/551,173, filed Jul. 11, 1990, pending which is a continuation of Ser. No. 244,154 filed Sep. 14, 1988, now abandoned, which is a continuation in part of Ser. No. 37,725 filed Apr. 13, 1987, now abandoned, and the benefits of 35 USC 120 and 356 USC 119 are claimed relative to it.

FIELD OF THE INVENTION

This invention relates to a process for producing a modified propylene-polymer composition. More particularly, it relates to a process for producing a modified propylene-polymer composition by blending a phenolic antioxidant, a polyol or a fatty acid partial ester of the above-mentioned polyol (hereinafter abbreviated as compound A) and a radical generating agent with a propylene polymer containing 5 ppm or more of titanium or 0.5 ppm or more of vanadium as a catalyst residue, and subjecting the resultant blend to a melting and kneading treatment at a temperature of 150° C.-300° C.

1. Background of the Invention

Since propylene polymer is relatively inexpensive and has superior mechanical properties, it is used in the production of various kinds of shaped articles such as injection moldings, blow moldings, films, sheets, fibers and the like. Propylene polymers are fabricated at a temperature higher than their melting points, but they undergo oxidative deterioration by the heat at the time of their melting and kneading which gives rise to a reduction of mechanical strength due to the scission of the molecular chain of the propylene polymer as well as problems of coloring and smell due to the oxidative deterioration. Particularly, since propylene-polymers have tertiary carbons susceptible to oxidation, they are liable to undergo heat oxidative deterioration and further there is also a problem in thermal stability at the time of practical use. On this account, with the object of preventing thermal oxidative deterioration at the time of melting and kneading, a low molecular weight phenolic antioxidant such as 2,6-di-t-butyl-p-cresol (BHT) and also with the object of providing heat-stability at the time of practical use, high molecular weight phenolic antioxidants have been widely used.

However, when a propylene-polymer composition blended with the above-mentioned phenolic antioxidants is melted and kneaded, the phenolic antioxidant is oxidized when the propylene polymer contains a complex compound of titanium or vanadium in the catalyst residue of the propylene polymer to form a quinone compound with the result that the propylene polymer becomes colored.

2. Prior Art

A propylene polymer composition obtained by blending pentaerythritol or a polyol which is a reaction product of a pentaerythritol with propylene oxide, with a propylene polymer [Official Gazette of Japanese unexamined patent application (Tokukai) No. 213036 of 1983] and a propylene polymer composition obtained by blending one or more than one compound of a polyol, or phosphite or thiophosphite with a propylene polymer [Journal of applied polymer science, 29, pages 4421-4426 (1984)] have been proposed.

A process is known for producing a modified propylene polymer in which a propylene polymer is subjected to a treatment of melting and kneading in the presence of a radical generating agent to degrade a molecular chain, i.e. to reduce the molecular weight of the propylene polymer, in order to improve the shaping and fabricating property of the propylene polymer.

OBJECTS

We have found in studying the coloring of propylene polymers containing a large amount of titanium in the catalyst residue or vanadium in the catalyst residue, that even if a phenolic antioxidant is blended with propylene polymer containing a large amount of titanium or vanadium in the catalyst residue, followed by the treatment of melting and kneading, no coloring occurs to the extent of causing a practical problem, but if the propylene polymer composition containing such a blended phenolic antioxidant is subjected to the treatment of melting and kneading in the presence of a radical generating agent to obtain a modified product, the resultant modified propylene polymer composition is noticeably colored. This phenomenon is not described in the above-mentioned Official Gazette of Japanese unexamined patent application No. 213036 of 1983 and Journal of Applied Polymer Science 29, pages 4421-4426 (1984).

With the object of improving the shaping and fabricating property of propylene polymers containing a large amount of titanium as a catalyst residue or propylene polymers containing a vanadium as a catalyst residue, that are blended with a phenolic antioxidant, we undertook research to find a process for obtaining a modified propylene polymer composition which does not show coloring even when subjected to the treatment of melting and kneading in the presence of a radical generating agent. As the result of this research, we discovered that when a propylene-polymer containing 5 ppm or more of titanium as a catalyst residue of 0.5 ppm or more of vanadium as a catalyst residue is blended with a specified amount of a phenolic antioxidant, a polyol or partial ester of such a polyol with a fatty acid (hereinafter referred to as compound A) and a radical generating agent, and then subjected to the treatment of melting and kneading, a modified propylene polymer composition is obtained which does not undergo coloring.

As is evident from the above, it is an object of the present invention to provide a process for producing a modified propylene polymer composition which does not undergo coloring, by blending a compound A, a phenolic antioxidant and a radical generating agent with a propylene polymer containing 5 ppm or more of titanium as a catalyst residue or 0.5 ppm or more of vanadium as a catalyst residue and then subjecting the blend to the treatment of melting and kneading.

SUMMARY OF THE INVENTION

The present invention is directed to a process for producing a modified propylene polymer composition comprising blending 0.01-1 parts by weight of a polyol or a partial ester of said polyol with a fatty acid (which will be referred to as compound A); 0.01-1 parts by weight of a phenolic antioxidant; and 0.001-0.5 parts by weight of a radical generating agent and then subjecting the blend to the treatment of melting and kneading at a temperature of 150° C.-300° C.

DETAILED DESCRIPTION OF THE INVENTION

The propylene polymers used in the process of the present invention are those polymers having propylene units as the major portion of polymer sections and which contain 5 ppm or more of titanium as a catalyst residue or 0.5 ppm or more of vanadium as a catalyst residue. They are propylene polymers which can be obtained by a polymerization process, for example, a solution polymerization process carried in a saturated hydrocarbon solvent, a bulk polymerization process, a gas phase polymerization process or a combination of a bulk polymerization process and gas phase polymerization. In the production process of the present invention, there will be no trouble even if a propylene-polymer containing less than 5 ppm of titanium as a catalyst residue or less than 0.5 ppm of vanadium as a catalyst is used. In such cases the modified propylene polymer composition does not show coloring to the extent of being a practical problem.

The propylene polymers used in the present invention are those containing 5 ppm or more of titanium as a catalyst residue and include by way of illustration a propylene homopolymer; a crystalline random copolymer or a crystalline block copolymer of propylene and at least one alpha-olefin such as ethylene, butene-1, pentene-1, 4-methyl-pentene-1, hexene-1, octene-1, or the like; a copolymer of propylene and vinyl acetate or an ester of acrylic acid or saponification products of these copolymers, a copolymer of propylene and an unsaturated carbolic acid or its anhydride, a reaction product of a copolymer of propylene and an unsaturated carboxylic acid or its anhydride with a metal ion compound. It is possible to use these propylene polymers or in the form of a mixture.

A mixture of the above-mentioned propylene polymers with various kinds of synthetic rubber (such as ethylene-propylene copolymer rubber, ethylene-propylene-nonconjugative diene copolymer rubber, polybutadiene, polyisoprene, chlorinated polyethylene, chlorinated polypropylene, styrene-butadiene rubber, styrene-butadiene-styrene block copolymer, styrene-isoprene styrene block copolymer, styrene-ethylene-butylenestyrene block copolymer, styrene-propylene-butylene-styrene block copolymer, etc.) and thermoplastic synthetic resins (such as polyolefins other than such propylene polymer as polyethylene, polybutene, poly-4-methylpentene-1, etc., polystyrene, styrene-acrylonitrile copolymer, acrylonitrile butadiene-styrene copolymer, polyamide, polyethylene terephthalate, polybutylene terephthalate, polyvinyl chloride, etc.) can be used.

A propylene-polymer containing 5 ppm or more of titanium as a catalyst residue or 0.5 ppm or more of vanadium as a catalyst residue, or a propylene homopolymer, crystalline ethylene-propylene random copolymer, crystalline ethylene-propylene block copolymer, crystalline propylene-butene-1 random copolymer, crystalline ethylene-propylene-butene-1 terpolymer, and crystalline propylene-hexene-butene-1 terpolymer are particularly preferable.

As compound A useful in the present invention polyols such as glycerine, trimethylol ethane, trimethylol propane, erythritol, pentaerythritol, dipentaerythritol, tripentaerythritol, xylitol, sorbitol, mannitol or the like, monoester of glycerine with fatty acid, monoester of diglycerine with fatty acid, monester of triglycerine with fatty acid, monoester of pentaglycerine with fatty acid, monoester of sorbitan with fatty acid, monoester of cane sugar with fatty acid, mono- or diester of pentaerythritol and fatty acid, monoester of trimethylol ethane with fatty acid, monoester of trimethylol propane with fatty acid, monoester of polyoxyethylene glycerine with fatty acid, monoester of polyoxyethylene sorbitane with fatty acid, a partial ester of polyol with a fatty acid (such as e.g. lauric acid, myristic acid, palmitic acid, stearic acid, behenic acid, oleic acid) can be mentioned. Particularly preferred are trimethylol ethane, a monoester of glycerine with fatty acid, mono-, or a di-ester of pentaerythritol with fatty acid.

As phenolic antioxidant, 2,6-di-t-butyl-p-cresol, 2-t-butyl-4,6-dimethylphenol, 2,6-di-t-butyl-4-ethylphenol, 2,6-di-t-butyl-4-n-butylphenol, 2,6-di-i-butyl-4-n-butylphenol, 2,6-dicyclopentyl-4-methylphenol, 2-($\alpha$-methylcyclohexyl)-4,6-dimethylphenol, 2,6-di-octadecyl-4-methylphenol, 2,4,6-tricyclohexylphenol, 2,6-di-t-butyl-4-methoxymethylphenol, n-octadecyl-$\beta$-(4'-hydroxy-3',3'-di-t-butylphenol)propionate, 2,6-diphenyl-4-octadecyloxyphenol, 2,4,6-tris(3',5'-di-t-butyl-4'-hydroxybenzylthio)-1,3,5,triazine, 2,6-di-t-butyl-4-methoxyphenol, 2,5-di-t-butylhydroquinone, 2,5-di-t-amylhydroquinone, 2,2'-thio-bis-(6-t-butyl-4-methylphenol), 2,2'-thio-bis-(4-octylphenol), 2,2'-thio-bis-(6-t-butyl-3-methylphenol), 4,4'-thio-bis-(6-t-butyl-2-methylphenol), 2,2'-methylene-bis-(6-t-butyl-4-methylphenol), 2,2'-methylene-bis-(6-t-butyl-4-ethylphenol), 2,2'-methylene-bis[4-methyl-6-($\alpha$-methylcyclohexyl)-phenol], (4-methyl-6-cyclohexylphenol), 2,2'-methylene-bis-(6-nonyl-4-methylphenol), 2,2'-methylenebis-[6-($\alpha$-methylbenzyl)-4-nonylphenol], 2,2'-methylenebis-[6-($\alpha,\alpha$-dimethylbenzyl)-4-nonylphenol], 2,2'-methylene-bis-(4,6-di-t-butylphenol), 2,2'-ethylidenebis-(4,6-di-t-butylphenol), 2,2'-ethylidene-bis-(6-t-butyl-4-i-butylphenol), 4,4'-methylene-bis-(2,6-di-t-butylphenol), 4,4'-methylene-bis-(6-t-butyl-2-methylphenol), 4,4'-butylidene-bis-(6-t-butyl-2-methylphenol), 4,4'-butylidene-bis-(6-t-butyl-3-methylphenol), 4,4'-butylidenebis-(2,6-di-t-butylphenol), 4,4'-butylidene-bis-(3,6-di-t-butylphenol), 1,1-bis-(5-t-butyl-4-hydroxy-2-methylphenol)-butane, 2,6-di-(3-t-butyl-5-methyl-2-hydroxybenzyl)-4-methylphenol, 1,1,3-tris-(5-t-butyl-4-hydroxy-2-methyl-phenyl)-butane, bis[3,3-bis(4'-hydroxy-3'-t-butylphenyl)butyric acid]ethylene glycol ester, di-(3-t-butyl-4-hydroxy-5-methylphenyl dicyclopentadiene, di-[2-(3'-t-butyl-2'-hydroxy-5'-methylbenzyl)-6-t-butyl-4-methylphenyl]terephthalate, 1,3,5-trimethyl-2,4,6-tris(3,5-di-t-butyl-4-hydroxybenzyl) benzene, 1,3,5-tris(3,5-di-t-butyl-4-hydroxybenzyl) isocyanurate, 1,3,5 TM tris-(4-t-butyl-3-hydroxy-2,6-dimethylbenzyl) isocyanurate, 1,3,5-tris-[(3,5-di-t-butyl-4-hydroxyphenyl)propionyloxyethyl]isocyanurate or tetrakis[-methylene-3-(3',5'-di-t-butyl-4'-hydroxyphenyl) propionate] methane can be illustrated.

Blending proportions of said compound A and a phenolic antioxidant are, each 0.01–1 parts by weight preferably 0.05–0.5 parts by weight per 100 parts by weight of propylene polymer. Blending less than 0.01 part by weight cannot exhibit a sufficient effect to prevent the modified propylene polymer composition from being colored. It does not matter even if it is over one part by weight of compound A is used, but an increase in color prevention cannot be expected and hence it is both impractical and uneconomical.

As for the radical generating agents used in the present invention, it is preferable for obtaining a uniform composition that the decomposition temperature thereof is not too low. The radical generating agents having a half-life of 10 hours at the temperature of 70° C. or higher, preferably 100° C. or higher, are preferable. As such organic peroxides, benzyl peroxide, t-butyl perbenzoate, t-butyl peracetate, t-butyl peroxyisopropylcarbonate, 2,5-di-methyl-2,5-di-(benzylperoxy)hexane, 2,5-di-methyl2,5-di-(benzoyl peroxy)hexyne-3, t-butyl-di-peradipate, t-butyl peroxy-3,5,5-trimethyl hexanoate, methyl-ethyl ketone peroxide, cyclohexanon peroxide, di-t-butyl peroxide, dicumyl peroxide, 2,5-di-methyl-2,5-di-(t-butyl peroxy) hexane, 2,5-di-methyl-2,5-di-t-butylperoxy) hexyne-3, 1,3-bis-(t-butyl peroxyisopropyl) benzene, t-butyl cumyl peroxide, 1,1-bis-(t-butyl peroxy)-3,3,5-trimethylcyclohexane, 1,1-bis-(t-butyl peroxy) cyclohexane, 2,2-bis-(t-butyl peroxy) butane, p-menthan hydroperoxide, diisopropylbenzene hydroperoxide, cumenhydroperoxide, t-butyl hydroperoxide, p-cymenehydroperoxide, 1,1,3,3-tetramethylbutyl hydroperoxide or 2,5-di-methyl-2,5-di-(hydroperoxy)hexane, can be illustrated. Particularly, 2,5-di-methyl-2,5-di-(t-butyl peroxy)hexane, 2,5-di-methyl-2,5-di-(t-butyl peroxy)hexyne-3 or 1,3-bis-(t-butyl peroxyisopropyl) benzene is preferable. The blending proportion of the above-mentioned radical generating agent is generally in the range of 0.001–0.5 parts by weight, preferably in the range of 0.01–0.2 parts by weight based upon 100 parts by weight of propylene polymer.

Further, the method for the treatment of melting and kneading is carried out by various kinds of melting and kneading apparatus hereinafter described at a temperature of 150°–300° C., preferably 180° C.–270° C. If the melting and kneading temperature is lower than 150° C., a sufficient modifying effect, i.e. an improvement in processability cannot be attained, a a higher temperature than 300° C. is not preferable because heat oxidative degradation is promoted so that coloring of the propylene polymer composition becomes a problem.

In the process of the present invention, it is possible to include various kinds of other additives that are generally added to the propylene polymer containing 5 ppm or more of titanium or 0.5 ppm or more of vanadium as catalyst residues, e.g. a thioether or phosphorus containing antioxidant, light stabilizer, clarifier, nucleating agent, lubricant, antistatic agent, antifogging agent, antiblocking agent, antidropping agent, dispersing agent such as metal soaps, neutralizing agent, inorganic filler (e.g. talc, mica, clay, wallastonite, zeolite, asbestos, calcium carbonate, aluminum hydroxide, magnesium hydroxide, barium sulfate, calcium silicate, glass fibers, carbon fibers, the above-mentioned inorganic fillers which are surface-treated with a surface-treating agent such as coupling agent (e.g. silane containing agent, titanate containing agent, boron containing agent, aluminate containing agent, zirco-aluminate containing agent or the like) or organic filler (e.g. wood flour, pulp, waste paper, synthetic fiber, natural fibers or the like) can be used so long as it is not harmful to the object of the present invention. Particularly, simultaneous use of phosphorus containing antioxidant is preferable because coloringpreventive effect can be synergistically exhibited.

As preferable phosphorus-containing antioxidant, distearyl pentaerythritol-diphosphite, tetrakis (2,4-di-t-butyl phenyl)-4,4′-biphenylene-di-phosphonite, bis-(2,4-di-t-butylphenyl)pentaerythritol-diphosphite, bis(2,6-di-t-butyl-4-methylphenyl)pentaerythritol-diphosphite and tris(2,4-di-t-butylphenyl)phosphite can be illustrated.

The production process of the present invention can be carried out by blending a definite amount of the above-mentioned compound A, a phenolic antioxidant, a radical generating agent and any of the above-mentioned various kinds of additives that are generally added to propylenepolymers with the propylene polymer containing 5 ppm or more of titanium or 0.5 ppm or more of vanadium in the catalyst residue in a common mixing apparatus e.g. Henschel mixer (tradename), super-mixer, ribbon blender, banbury mixer at a temperature to the extent that the blended radical generating agent is not decomposed and then subjected to the treatment of melting and kneading at a temperature of 150° C.–300° C., preferably 180° C.–270° C.

Function

As is well known, a phenolic antioxidant performs the function of an inhibitor for extending a radical chain and a radical generating agent generates radicals by the treatment of melting and kneading, i.e. heating and performs the scission of the principal polymer chain of the propylene polymer to reduce the molecular weight of the propylene polymer and to act to improve the shaping and fabricating properties.

It is not clear what kind of function the above-mentioned compound A performs relative to the titanium or vanadium complex compound at the time of the treatment of melting and kneading in the presence of a radical generating agent and the propylene polymer composition stabilized by a phenolic antioxidant, i.e. the mechanism of this function itself is not clear. However, in view of the fact that the effectiveness of the present invention cannot be achieved by the use of a perfect ester of a polyol with a fatty acid, it is possible that the alcoholic hydroxy group of the compound A acts on the complex compound of titanium or vanadium in the catalyst residue to form a stable chelate compound.

Effectiveness

Compared with a propylene polymer composition formed by blending a conventionally known phosphorus containing antioxidant or a perfect ester of a polyol with a fatty acid, the modified propylene polymer composition produced according to the present invention shows less coloring and improved shaping and fabricating properties and our composition can be advantageously used in the production of various kinds of shaped articles made by various kinds of shaping processes such as injection moulding, extrusion moulding, blow moulding or the like.

SPECIFIC EXAMPLES

The present invention will be more fully illustrated by way of Specific examples, Comparative examples and Referential examples but the invention should not be construed to be limited by these examples.

Further, the evaluation method used in the Specific examples, Comparative Examples and Referential Examples is as follows:

Coloring property: The YI (Yellowness Index) of resultant pellets was measured (according to JIS K7103) and evaluation of coloring was made according to the value of YI. The smaller this value, the less the coloring.

Shaping and fabricating property (moldability): By measuring the melt flow rate (MFR) of resulting pellet (based upon JISK6738). The shaping and fabricating property was evaluated according to how large these values are. The larger these measured values, the greater the improvement of shaping and fabricating properties.

SPECIFIC EXAMPLES 1–16, COMPARATIVE EXAMPLES 1–3 AND REFERENTIAL EXAMPLES 1–3

In Examples 1–16, 100 parts by weight of powdered form of propylene homopolymer having a MFR (expressed by extruded amount of melted resin for 10 minutes under a load of 2.16 Kg) of 2.0 g/10 minutes and titanium content of 30 ppm as a propylene polymer, trimethylol ethane, glycerine monostearate, pentaerythritol, pentaerythritol monostearate or pentaerythritol distearate, as a compound A; 2,6-di-t-butyl-p-cresol, tetrakis[methylene-3-(3′,5′-di-t-butyl-4′-hydroxyphenyl)propionate]methane, 1,3,5-trimethyl-2,4,6-tris(3,5-di-t-butyl-4-hydroxybenzyl)-benzene, 1,3,5-tris(3,5-di-t-butyl-4-hydroxybenzyl)-isocyanurate or n-octadecyl-8-(4′-hydroxy-3′,5′-di-t-butylphenyl)propionate, as a phenolic oxidant; 2,5-di-methyl-2,5-di(t-butylperoxy)hexane or 1,3-bis-(t-butylperoxyisopropyl)benzene as a radical generating agent; and other additives each in definite amounts, at the blending proportion indicated in table 1 hereinafter described, were introduced into Henschel mixer (tradename). After mixing with stirring for 3 minutes, resultant blends were modified by subjecting to the treatment of melting and kneading at 200° C. by using a single screw extruder having a diameter of 40 mm to obtain pellets of modified propylene polymer composition.

In Comparative examples 1–3 and Referential examples 1–3, each definite amount of the additives described in Table 1 hereinafter described were blended with 100 parts by weight of powdered propylene homopolymer having a MFR of 2.0 g/10 min (titanium content of 30 ppm) and resulting blends were subjected to melting and kneading treatment based upon the process of Examples 1–16.

With regard to the resultant pellets, the evaluation of the coloring property and the processing property were carried out according to the above-mentioned testing method. The results thereof are shown in Table 1.

SPECIFIC EXAMPLES 17–32, COMPARATIVE EXAMPLES 4–6 AND REFERENCTIAL EXAMPLES 4–6

In Examples 17–32, 100 parts by weight of crystalline powdered ethylene-propylene random copolymer having a MFR of 7.0 g/10 min, ethylene content of 2.5% by weight and titanium content of 33 ppm, as propylene polymer; trimethylolethane, glycerine monostearate, pentaerythritol monostearate or pentaerythritol distearate, as a compound A; 2,6-di-t-butyl-p-cresol, tetrakis[-methylene-3-(3′,5′-di-t-butyl-4′-hydroxyphenyl)propionate]methane, 1,3,5-trimethyl-2,4,6-tris(3,5-di-t-butyl-4-hydroxybenzyl)-benzene, 1,3,5-tris-(3,5-di-t-butyl-4-hydroxybenzyl)-isocyanurate or n-octadecyl-62-(4′-hydroxy-3′,5′-di-t-butylphenyl)propionate, as a phenolic antioxidant; 2,5-di-methyl-2,5-di-(t-butylperoxy)-hexane or 1,3-bis-(t-butylperoxyisopropyl)benzene, as a radical generating agent: and other additives, each in definite amounts of the blending proportion indicated in Table 2 hereinafter described were charged to Henschel mixer (tradename). After mixing with stirring for 3 minutes the resultant mixtures were subjected to the treatment of melting and kneading at 200° C. by using a single-screw extruder having a diameter of 40 mm to obtain pellets of modified propylene polymer composition.

In Comparative examples 4–6 and Referential examples 4–6, 100 parts by weight of crystalline, powdered ethylene-propylene random copolymer having a MFR of 7.0 g/10 min ethylene content of 2.5% by weight and titanium content of 33 ppm, and definite amounts of the additives indicated in Table 2 hereinafter described were blended and the resultant blends were subjected to the treatment of melting and kneading based upon the process of Examples 17–32 and modified pellets were obtained.

With regard to the resultant pellets, the evaluations of coloring property and processing property were carried out according to the above-mentioned testing method. The results thereof are shown in Table 2.

SPECIFIC EXAMPLES 33–48, COMPARATIVE EXAMPLES 7–9 AND REFERENTIAL EXAMPLES 7–9

100 parts by weight of crystalline powdered ethylene-propylene block copolymer having a MFR of 4.0 g/10 min, ethylene content of 8.5% by weight and titanium content of 33 ppm as a propylene polymer; trimethylolethane, glycerine monostearate or pentaerythritol monostearate or pentaerythritol distearate, as compound A; 2,6-di-t-butyl-p-cresol, tetrakis[methylene-3-(3′,5′-di-t-butyl-4′-hydroxyphenyl)propionate]-methane, 1,3,5-trimethyl-2,4,6-tris(3,5-di-t-butyl-4-hydroxybenzyl)benezene, 1,3,5-tris-(3,5-di-t-butyl-4-hydroxybenzyl) isocyanurate, or n-octadecyl-β-(4′-hydroxy-3′,5′-di-t-butylphenyl)propionate as a phenolic antioxidant; 2,5-di-methyl-2,5-di-(t-butylperoxy)hexane or 1,3-bis-(t-butylperoxyisopropyl)benzene, as a radical generating agent; and other additives each in definite amounts of the blending proportion indicated in Table 3 hereinafter described were charged to Henschel mixer (tradename). After mixing with stirring, the blends were subjected to the treatment of melting and kneading at 200° C. by using a single screw extruder having a diameter of 40 mm to obtain modified propylene polymer composition.

Further in Comparative examples 7–9 and Referential examples 7–9, 100 parts by weight of crystalline powdered ethylene-propylene block copolymer having MFR of 4.0 g/10 min., ethylene content of 8.5% by weight and titanium content of 33 ppm as a propylene polymer; were blended with each definite amounts of additives indicated in Table 3 to the treatment of melting and kneading based upon the process of Specific examples 33–48 to obtain pellets of modified propylene polymer composition.

Resultant pellets were subjected to evaluation of coloring properties and processing property according to the above-mentioned testing method. The results thereof are indicated in Table 3.

SPECIFIC EXAMPLES OF 49–64, COMPARATIVE EXAMPLES 10–12 AND REFERENTIAL EXAMPLES 10–12

100 parts by weight of a crystalline, powdered ethylene-propylene-butene-1, terpolymer having a MFR of 7.0 g/10 min. ethylene content of 2.5% by weight, butene-1 content of 4.5% by weight, and titanium content of 33 ppm, as a propylene polymer; trimethylol ethane, glycerine monostearate, pentaerythritol monostearate or pentaerythritol distearate, as a compound A, 2,6-di-t-butyl-p-cresol, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, 1,3,5-tris-(3,5-di-t-butyl-4-hydroxybenzyl)isocyanurate or n-octadecyl-β-(4'-hydroxy-3',5'-di-t-butylphenyl)-propionate, as a phenolic antioxidant; 2,5-di-methy-2,5-di-(t-butylperoxy)hexane or 1,3-bis-(t-butylperoxy isopropyl)benzene as a radical generating agent; and other additives each in definite amounts of the blending proportion indicated in Table 4 hereinafter described were charged to Henschel mixer (tradename). After mixing with stirring for 3 minutes, the blends were subjected to melting and kneading treatment at 200° C. by using a single screw extruder having a diameter of 40 mm to obtain pellets of modified propylene polymer composition. In comparative examples 10–12 and Referential examples 10–12, 100 parts by weight of a crystalline powdered ethylene-propylene-butene-1-terpolymer having a MFR of 7.0 g/10 minutes, ethylene content of 2.5% by weight, butene-1 content of 4.5% by weight and titanium content of 33 ppm and additives each in definite amounts indicated in Table 4 hereinafter described, were blended and by the treatment of melting and kneading based upon the process of Specific examples 49–64, pellets of modified propylene polymer composition were obtained.

With regard to the obtained pellets, evaluations of coloring property and processing property were carried out according to the above-mentioned testing method. The results thereof are indicated in Table 4.

SPECIFIC EXAMPLES 65–80, COMPARATIVE EXAMPLES 13–15 AND REFERENTIAL EXAMPLES 13–15

In specific examples 65–80, 100 parts by weight of powdered propylene homopolymer having a MFR of 2.0 g/10 min., vanadium content of 0.6 ppm as a propylene polymer; trimethylolethane, glycerine monostearate, pentaerythritol monostearate or pentaerythritol distearate, as compound A; 2,6-di-t-butyl-p-cresol, tetrakis[methane-3-(3',5'-di-t-butyl-4'-hydroxyphenylpropionate]methane, 1,3,5-trimethyl-2,4,6-tris(3,5-di-t-butyl-4-hydroxybenzyl)benzene, 1,3,5-tris-(3,5-di-t-butyl-4-hydroxybenzyl)isocyanurate or n-octadecyl-β-(4'-hydroxy-3',5'-di-t-butylphenyl)propionate, as a phenolic antioxidant; 2,5-di-methyl-2,5-di-(t-butylperoxy)-hexane or 1,3-bis-(t-butylperoxyisopropyl)benzene, as a radical generating agent; and other additives each in definite amounts of blending proportion indicated in Table 5 hereinafter described were charged to Henschel mixer (tradename). After the blends were mixed with stirring for 3 minutes they were subjected to melting and kneading treatment at 200° C. by using a single screw extruder having a diameter of 40 mm to obtain pellets of modified propylene polymer composition.

In Comparative examples 13–15, and Referential examples 13–15, 100 parts by weight of powdered propylene homopolymer having a MFR of 2.0 g/10 min. and a vanadium content of 0.6 ppm as a propylene polymer, and additives each in definite amounts indicated in Table 5 hereinafter described were blended and the blends were subjected to mixing with stirring and then melting and kneading treatment based upon the process of Specific examples 65–88 to obtain pellets of modified propylene polymer composition.

Resulting pellets were subjected to the evaluations of coloring property and processing property according to the above-mentioned testing method. The results thereof are indicated in Table 5.

SPECIFIC EXAMPLES 81–96, COMPARATIVE EXAMPLES 16–18 AND REFERENTIAL EXAMPLES 16–18

In Examples 81–96, 100 parts by weight of powdered crystalline ethylene-propylene random copolymer having a MFR of 7.0 g/10 min., ethylene content of 2.5% by weight and vanadium content of 0.6 ppm as a propylene polymer; trimethylol ethane, glycerine monostearate, pentaerythritol monostearate or pentaerythritol distearate as a compound A; 2,6-di-t-butyl-p-cresol, tetrakis[methylene-3-(3',5'-di-t-butyl-4'-hydroxyphenyl)propionate]methane, 1,3,5-trimethyl-2,4,6-tris-(3,5-di-t-butyl-4-hydroxybenzyl) benzene, 1,3,5-tris-(3,5-di-t-butyl-4-hydroxybenzyl)isocyanurate or n-octadecyl-8-(4'-hydroxy-3',5'-di-t-butylphenyl)propionate, as a phenolic antioxidant; 2,5-dimethyl-2,5-di-(t-butylperoxy)hexane or 1,3-bis-(t-butylperoxyisopropyl)benzene, as a radical generating agent; and other additives indicated in Table 6 hereinafter described each in blending proportion described in Table 6 were charged to Henschel mixer (tradename). After being mixed with stirring for 3 minutes, the blends were subjected to melting and kneading treatment by using a single screw extruder having a diameter of 40 mm to obtain pellets of modified propylene polymer composition.

In Comparative examples 16–18 and Referential examples 16–18, 100 parts by weight of powdered crystalline ethylene-propylene random copolymer having a MFR of 7.0 g/10 min, ethylene content of 2.5% by weight and vanadium content of 0.6 ppm, as a propylene polymer; and additives indicated in Table 6 hereinafter each in definite amounts were blended the blends were mixed with stirring and subjected to the treatment of melting and kneading based upon the process of Specific examples 81–96 to give pellets of modified propylene polymer composition.

Resultant pellets were subjected to the above-mentioned testing method to evaluate their coloring property and processing property. The results thereof are shown in Table 6.

SPECIFIC EXAMPLES 97–112, COMPARATIVE EXAMPLES 19–21 AND REFERENTIAL EXAMPLES 19–21

In Specific examples 97–112, 100 parts by weight of a powdered, crystalline ethylene-propylene block copolymer having a MFR of 4.0 g/10 min. ethylene content of 8.5% by weight and vanadium content of.0.6 ppm, as a propylene polymer; trimethylol ethane, glycerine monostearate, pentaerythritol monostearate or pentaerythritol distearate as a compound A; 2,6-di-t-butyl-p-cresol, tetrakis[methylene-3-(3',5'-di-t-butyl-4'-hydroxyphenyl)propionate]methane, 1,3,5-trimethyl-2,4,6-tris(3,5-d-t-butyl-4-hydroxybenzyl)benzene, 1,3,5-tris-(3,5-di-t-butyl-4-hydroxybenzyl)isocyanurate or n-octadecyl-8-(4'-hydroxy-3',5'-di-t-butylphenol)-propionate, as a phenolic antioxidant; 2,5-di-methyl-2,5-di-(t-butylperoxy)hexane or 1,3-bis-(t-butyl peroxy isopropyl)benzene, as a radical generating agent; and other additive each in definite amounts of blending proportion indicated in Table 7 hereinafter described were charged to Henschel mixer (tradename). After being mixed with stirring for 3 minutes, the blends were subjected to melting and kneading treatment at 200° C. by using a single-screw extruder having a diameter of 40 mm to obtain pellets of modified propylene polymer composition.

In Comparative examples 19-21 and Referential example 19-21, 100 parts by weight of powdered crystalline ethylene-propylene block copolymer having a MFR of 4.0 g/10 min, an ethylene content of 8.5% by weight and a vanadium content of 0.6 ppm, as a propylene polymer; each definite amounts of the additives indicated in Table 7 hereinafter described were blended and mixing with stirring and melting and kneading treatment were carried out based upon the process of Specific examples 97-112 to give pellets of modified propylene polymer composition.

Resultant pellets were subjected to the above-mentioned testing method to evaluate their coloring property and processing property. The results thereof are shown in Table 7.

SPECIFIC EXAMPLES 113-128, COMPARATIVE EXAMPLES 22-24 AND REFERENTIAL EXAMPLES 22-24

In Specific examples 113-128, 100 parts by weight powdered crystalline ethylene-propylene-butene-1, terpolymer having a MFR of 7.0 g/10 min. ethylene content of 2.5% by weight, butene-1 content of 4.5% by weight and vanadium content of 0.6 ppm, as a propylene polymer; trimethylolethane, glycerine monostearate, pentaerythritol monostearate or pentaerythritol distearate as a compound A; 2,6-di-t-butyl-p-cresol, tetrakis[methylene-3-(3',5'-di-t-butyl-4'-hydroxyphenyl)propionate]methane, 1,3,5-trimethyl-2,4,6-tris(3,5-di-t-butyl-4-hydroxybenzyl)benzene, 1,3,5-tris-(3,5-di-t-butyl-4-hydroxybenzyl)isocyanurate or n-octadecyl-$\beta$-(4'-hydroxy-3',5'-di-t-butylphenyl)propionate, as a a phenolic antioxidant; 2,5-di-methyl-2,5-di-(t-butyl peroxy)hexane or 1,3-bis-(t-butyl peroxyisopropyl) benzene, as a radical generating agent and other additives, each in definite amounts of the blending proportion indicated in Table 8 hereinafter described were charged to Henschel mixer (tradename).

After mixed with stirring for 3 minutes, the blends were subjected to melting and kneading treatment at 200° C. by using a single screw extruder having a diameter of 40 mm to obtain pellets of modified propylene polymer composition.

Further in Comparative examples 22-24 and Referential examples 22-24, 100 parts by weight of powdered, crystalline ethylene-propylene-butene-1, terpolymer, having a MFR of 7.0 g/10 min. ethylene content of 2.5% by weight, 4.5% by weight of butene-1 and vanadium content of 0.6 ppm; as a propylene polymer; additives each in definite amounts were blended. Based upon the process of Specific examples 113-128, mixing with stirring and melting and kneading treatment were carried out to obtain pellets of modified propylene polymer composition.

Evaluation of coloring property and processing property for resultant pellets was carried out according to the above-mentioned testing method. Results thereof are indicated in Table 8.

Various kinds of compound and additives indicated in Tables 1-8 are as follows:

Compound A [I]: trimethylol ethane
Compound A [II]: glycerine monostearate
Compound A [III]pentaerythritol monostearate
Compound A [IV]: pentaerythritol distearate
Phenolic antioxidant [I]: 2,6-di-t-butyl-p-cresol
Phenolic antioxidant [II]: tetrakis[methylene-3-(3',5'-di-t-butyl-4'-hydroxyphenyl)propionate]methane
Phenolic antioxidant [III]: 1,3,5-trimethyl-2,4,6-tris(3,5-di-t-butyl-4-hydroxybenzyl)benzene
Phenolic antioxidant [IV]: 1,3,5-tris-(3,5-di-t-butyl-4-hydroxybenzyl)isocyanurate
Phenolic antioxidant [V]: n-octadecyl-$\beta$-(4'-hydroxy-3',5'-di-t-butylphenyl)propionate
Radical generating agent [I]: 2,5-di-methyl-,2,5-di-(t-butylperoxy)hexane
Radical generating agent [II]: 1,3-bis-(t-butyl peroxyisopropyl)benzene
Phosphorus-containing antioxidant I: tetrakis(2,4-di-t-butylphenyl)-4,4'-biphenylene-di-phosphonite
Phosphorus-containing antioxidant 2: bis(2,4-di-t-butylphenyl)pentaerythritol-diphosphite
Polyol compound (perfect ester of polyol with fatty acid): pentaerythritol tetrastearate Ca-St: calcium stearate

TABLE 1

| | Specific example | | | | | | | | | | |
|---|---|---|---|---|---|---|---|---|---|---|---|
| | 1 | 2 | 3 | 4 | 5 | 6 | 7 | 8 | 9 | 10 | 11 |
| parts by weight of additives blended per 100 parts by weight of resin | | | | | | | | | | | |
| Compound A [I] | 0.1 | | | | 0.1 | | | | 0.1 | 0.1 | 0.1 |
| Compound A [II] | | 0.1 | | | | 0.1 | | | | | |
| Compound A [III] | | | 0.1 | | | | 0.1 | | | | |
| Compound A [IV] | | | | 0.1 | | | | 0.1 | | | |
| Phenolic antioxidant [I] | 0.1 | 0.1 | 0.1 | 0.1 | 0.1 | 0.1 | 0.1 | 0.1 | | | |
| Phenolic antioxidant [II] | 0.05 | 0.05 | 0.05 | 0.05 | 0.05 | 0.05 | 0.05 | 0.05 | 0.05 | 0.05 | |
| Phenolic antioxidant [III] | | | | | | | | | | | 0.05 |
| Phenolic antioxidant [IV] | | | | | | | | | | | |
| Phenolic antioxidant [V] | | | | | | | | | | | |
| Radical generating agent [I] | 0.01 | 0.01 | 0.01 | 0.01 | | | | | | | |
| Radical generating agent [II] | | | | | 0.01 | 0.01 | 0.01 | 0.01 | 0.01 | 0.01 | 0.01 |
| Phosphorus containing anti- | | | | | | | | | 0.05 | | |

TABLE 1-continued

|  | | | | | | | | | | | |
|---|---|---|---|---|---|---|---|---|---|---|---|
| oxidant 1 | | | | | | | | | | | |
| Phosphorus containing antioxidant 2 | | | | | | | | | 0.05 | | |
| pentaerythritol tetrastearate | | | | | | | | | | | |
| Ca-St | 0.1 | 0.1 | 0.1 | 0.1 | 0.1 | 0.1 | 0.1 | 0.1 | 0.1 | 0.1 | 0.1 |
| YI of pellets (%) | 1.8 | 2.4 | 2.1 | 2.1 | 1.9 | 2.4 | 2.2 | 2.1 | 1.3 | 1.3 | 1.7 |
| MFR of pellets (g/10 min) | 4.4 | 4.5 | 4.4 | 4.5 | 5.3 | 5.4 | 5.4 | 5.5 | 5.6 | 5.6 | 5.6 |

|  | Specific example | | | | | Comparative example | | | Referential example | | |
|---|---|---|---|---|---|---|---|---|---|---|---|
|  | 12 | 13 | 14 | 15 | 16 | 1 | 2 | 3 | 1 | 2 | 3 |
| parts by weight of additives blended per 100 parts by weight of resin | | | | | | | | | | | |
| Compound A [I] | | | | 0.1 | 0.1 | | | | | | |
| Compound A [II] | 0.1 | | | | | | | | | | |
| Compound A [III] | | 0.1 | | | | | | | | | |
| Compound A [IV] | | | 0.1 | | | | | | | | |
| Phenolic antioxidant [I] | | | | | | | | | 0.1 | | |
| Phenolic antioxidant [II] | | | | | | 0.05 | 0.05 | 0.05 | 0.05 | 0.05 | 0.05 |
| Phenolic antioxidant [III] | 0.05 | 0.05 | 0.05 | | | | | | | | |
| Phenolic antioxidant [IV] | | | | 0.05 | | | | | | | |
| Phenolic antioxidant [V] | | | | | 0.05 | | | | | | |
| Radical generating agent [I] | | | | | | | | | | | |
| Radical generating agent [II] | 0.01 | 0.01 | 0.01 | 0.01 | 0.01 | 0.01 | 0.01 | 0.01 | | | |
| Phosphorus containing antioxidant 1 | | | | | | 0.05 | | | | 0.05 | |
| Phosphorus containing antioxidant 2 | | | | | | | 0.05 | | | | 0.05 |
| pentaerythritol tetrastearate | | | | | | | | 0.1 | | | |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.3 | 2.1 | 2.1 | 2.2 | 2.2 | 8.3 | 8.4 | 6.8 | 1.6 | 1.4 | 1.4 |
| MFR of pellets (g/10 min) | 5.5 | 5.6 | 5.6 | 5.7 | 5.9 | 5.6 | 5.6 | 5.7 | 1.8 | 1.8 | 1.7 |

TABLE 2

|  | Specific example | | | | | | | | | | |
|---|---|---|---|---|---|---|---|---|---|---|---|
|  | 17 | 18 | 19 | 20 | 21 | 22 | 23 | 24 | 25 | 26 | 27 |
| parts by weight of additives blended per 100 parts by weight of resin | | | | | | | | | | | |
| Compound A [I] | 0.1 | | | | 0.1 | | | | 0.1 | 0.1 | 0.1 |
| Compound A [II] | | 0.1 | | | | 0.1 | | | | | |
| Compound A [III] | | | 0.1 | | | | 0.1 | | | | |
| Compound A [IV] | | | | 0.1 | | | | 0.1 | | | |
| Phenolic antioxidant [I] | 0.1 | 0.1 | 0.1 | 0.1 | 0.1 | 0.1 | 0.1 | 0.1 | | | |
| Phenolic antioxidant [II] | 0.05 | 0.05 | 0.05 | 0.05 | 0.05 | 0.05 | 0.05 | 0.05 | 0.05 | 0.05 | |
| Phenolic antioxidant [III] | | | | | | | | | | | 0.05 |
| Phenolic antioxidant [IV] | | | | | | | | | | | |
| Phenolic antioxidant [V] | | | | | | | | | | | |
| Radical generating agent [I] | 0.01 | 0.01 | 0.01 | 0.01 | | | | | | | |
| Radical generating agent [II] | | | | | 0.01 | 0.01 | 0.01 | 0.01 | 0.01 | 0.01 | 0.01 |
| Phosphorus containing antioxidant 1 | | | | | | | | | 0.05 | | |
| Phosphorus containing antioxidant 2 | | | | | | | | | | 0.05 | |
| pentaerythritol | | | | | | | | | | | |

TABLE 2-continued

| | | | | | | | | | | | |
|---|---|---|---|---|---|---|---|---|---|---|---|
| tetrastearate | | | | | | | | | | | |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.0 | 2.6 | 2.2 | 2.3 | 2.0 | 2.5 | 2.5 | 2.4 | 1.5 | 1.6 | 1.9 |
| MFR of pellets (g/10 min) | 15.7 | 15.9 | 15.8 | 15.9 | 19.6 | 19.8 | 19.9 | 20.1 | 20.3 | 20.1 | 20.3 |

| | Specific example | | | | | Comparative example | | | Referential example | | |
|---|---|---|---|---|---|---|---|---|---|---|---|
| | 28 | 29 | 30 | 31 | 32 | 4 | 5 | 6 | 4 | 5 | 6 |
| parts by weight of additives blended per 100 parts by weight of resin | | | | | | | | | | | |
| Compound A [I] | | | | 0.1 | 0.1 | | | | | | |
| Compound A [II] | 0.1 | | | | | | | | | | |
| Compound A [III] | | 0.1 | | | | | | | | | |
| Compound A [IV] | | | 0.1 | | | | | | | | |
| Phenolic antioxidant [I] | | | | | | | | | 0.1 | | |
| Phenolic antioxidant [II] | | | | | | 0.05 | 0.05 | 0.05 | 0.05 | 0.05 | 0.05 |
| Phenolic antioxidant [III] | 0.05 | 0.05 | 0.05 | | | | | | | | |
| Phenolic antioxidant [IV] | | | | 0.05 | | | | | | | |
| Phenolic antioxidant [V] | | | | | 0.05 | | | | | | |
| Radical generating agent [I] | | | | | | | | | | | |
| Radical generating agent [II] | 0.01 | 0.01 | 0.01 | 0.01 | 0.01 | 0.01 | 0.01 | 0.01 | | | |
| Phosphorus containing antioxidant 1 | | | | | | 0.05 | | | 0.05 | | |
| Phosphorus containing antioxidant 2 | | | | | | | 0.05 | | | 0.05 | |
| pentaerythritol tetrastearate | | | | | | | | 0.1 | | | |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.4 | 2.3 | 2.3 | 2.5 | 2.4 | 8.6 | 8.6 | 7.1 | 1.7 | 1.6 | 1.7 |
| MFR of pellets (g/10 min) | 20.0 | 20.4 | 20.5 | 20.8 | 21.0 | 20.8 | 20.7 | 21.1 | 6.7 | 6.8 | 6.7 |

TABLE 3

| | Specific example | | | | | | | | | | |
|---|---|---|---|---|---|---|---|---|---|---|---|
| | 33 | 34 | 35 | 36 | 37 | 38 | 39 | 40 | 41 | 42 | 43 |
| parts by weight of additives blended per 100 parts by weight of resin | | | | | | | | | | | |
| Compound A [I] | 0.1 | | | | 0.1 | | | | 0.1 | 0.1 | 0.1 |
| Compound A [II] | | 0.1 | | | | 0.1 | | | | | |
| Compound A [III] | | | 0.1 | | | | 0.1 | | | | |
| Compound A [IV] | | | | 0.1 | | | | 0.1 | | | |
| Phenolic antioxidant [I] | 0.1 | 0.1 | 0.1 | 0.1 | 0.1 | 0.1 | 0.1 | 0.1 | | | |
| Phenolic antioxidant [II] | 0.05 | 0.05 | 0.05 | 0.05 | 0.05 | 0.05 | 0.05 | 0.05 | 0.05 | 0.05 | |
| Phenolic antioxidant [III] | | | | | | | | | | | 0.05 |
| Phenolic antioxidant [IV] | | | | | | | | | | | |
| Phenolic antioxidant [V] | | | | | | | | | | | |
| Radical generating agent [I] | 0.01 | 0.01 | 0.01 | 0.01 | | | | | | | |
| Radical generating agent [II] | | | | | 0.01 | 0.01 | 0.01 | 0.01 | 0.01 | 0.01 | 0.01 |
| Phosphorus containing antioxidant 1 | | | | | | | | | 0.05 | | |
| Phosphorus containing antioxidant 2 | | | | | | | | | | 0.05 | |
| pentaerythritol tetrastearate | | | | | | | | | | | |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.1 | 2.6 | 2.2 | 2.3 | 2.1 | 2.5 | 2.6 | 2.5 | 1.4 | 1.4 | 1.8 |
| MFR of pellets (g/10 min) | 8.5 | 8.5 | 8.7 | 8.6 | 10.3 | 10.5 | 10.6 | 10.6 | 10.8 | 10.9 | 10.9 |

TABLE 3-continued

|  | Specific example | | | | | Comparative example | | | Referential example | | |
| --- | --- | --- | --- | --- | --- | --- | --- | --- | --- | --- | --- |
|  | 44 | 45 | 46 | 47 | 48 | 7 | 8 | 9 | 7 | 8 | 9 |
| parts by weight of additives blended per 100 parts by weight of resin | | | | | | | | | | | |
| Compound A [I] |  |  |  | 0.1 | 0.1 |  |  |  |  |  |  |
| Compound A [II] | 0.1 |  |  |  |  |  |  |  |  |  |  |
| Compound A [III] |  | 0.1 |  |  |  |  |  |  |  |  |  |
| Compound A [IV] |  |  | 0.1 |  |  |  |  |  |  |  |  |
| Phenolic antioxidant [I] |  |  |  |  |  |  |  |  | 0.1 |  |  |
| Phenolic antioxidant [II] |  |  |  |  |  | 0.05 | 0.05 | 0.05 | 0.05 | 0.05 | 0.05 |
| Phenolic antioxidant [III] | 0.05 | 0.05 | 0.05 |  |  |  |  |  |  |  |  |
| Phenolic antioxidant [IV] |  |  |  | 0.05 |  |  |  |  |  |  |  |
| Phenolic antioxidant [V] |  |  |  |  | 0.05 |  |  |  |  |  |  |
| Radical generating agent [I] |  |  |  |  |  |  |  |  |  |  |  |
| Radical generating agent [II] | 0.01 | 0.01 | 0.01 | 0.01 | 0.01 | 0.01 | 0.01 | 0.01 |  |  |  |
| Phosphorus containing antioxidant 1 |  |  |  |  |  | 0.05 |  |  |  | 0.05 |  |
| Phosphorus containing antioxidant 2 |  |  |  |  |  |  | 0.05 |  |  |  | 0.05 |
| pentaerythritol tetrastearate |  |  |  |  |  |  |  | 0.1 |  |  |  |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.4 | 2.4 | 2.3 | 2.4 | 2.4 | 8.7 | 8.6 | 7.1 | 1.8 | 1.5 | 1.6 |
| MFR of pellets (g/10 min) | 10.5 | 11.0 | 10.8 | 11.5 | 12.1 | 11.0 | 11.1 | 11.3 | 3.5 | 3.4 | 3.4 |

TABLE 4

|  | Specific example | | | | | | | | | | |
| --- | --- | --- | --- | --- | --- | --- | --- | --- | --- | --- | --- |
|  | 49 | 50 | 51 | 52 | 53 | 54 | 55 | 56 | 57 | 58 | 59 |
| parts by weight of additives blended per 100 parts by weight of resin | | | | | | | | | | | |
| Compound A [I] | 0.1 |  |  |  | 0.1 |  |  |  | 0.1 | 0.1 | 0.1 |
| Compound A [II] |  | 0.1 |  |  |  | 0.1 |  |  |  |  |  |
| Compound A [III] |  |  | 0.1 |  |  |  | 0.1 |  |  |  |  |
| Compound A [IV] |  |  |  | 0.1 |  |  |  | 0.1 |  |  |  |
| Phenolic antioxidant [I] | 0.1 | 0.1 | 0.1 | 0.1 | 0.1 | 0.1 | 0.1 | 0.1 |  |  |  |
| Phenolic antioxidant [II] | 0.05 | 0.05 | 0.05 | 0.05 | 0.05 | 0.05 | 0.05 | 0.05 | 0.05 | 0.05 |  |
| Phenolic antioxidant [III] |  |  |  |  |  |  |  |  |  |  | 0.05 |
| Phenolic antioxidant [IV] |  |  |  |  |  |  |  |  |  |  |  |
| Phenolic antioxidant [V] |  |  |  |  |  |  |  |  |  |  |  |
| Radical generating agent [I] | 0.01 | 0.01 | 0.01 | 0.01 |  |  |  |  |  |  |  |
| Radical generating agent [II] |  |  |  |  | 0.01 | 0.01 | 0.01 | 0.01 | 0.01 | 0.01 | 0.01 |
| Phosphorus containing antioxidant 1 |  |  |  |  |  |  |  |  | 0.05 |  |  |
| Phosphorus containing antioxidant 2 |  |  |  |  |  |  |  |  |  | 0.05 |  |
| pentaerythritol tetrastearate |  |  |  |  |  |  |  |  |  |  |  |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.0 | 2.5 | 2.3 | 2.2 | 2.1 | 2.5 | 2.3 | 2.3 | 1.5 | 1.4 | 1.9 |
| MFR of pellets (g/10 min) | 16.2 | 16.5 | 16.3 | 16.7 | 20.2 | 20.5 | 20.6 | 21.0 | 21.3 | 21.5 | 21.7 |

|  | Specific example | | | | | Comparative example | | | Referential example | | |
| --- | --- | --- | --- | --- | --- | --- | --- | --- | --- | --- | --- |
|  | 60 | 61 | 62 | 63 | 64 | 10 | 11 | 12 | 10 | 11 | 12 |
| parts by weight | | | | | | | | | | | |

TABLE 4-continued

| | | | | | | | | | | | |
|---|---|---|---|---|---|---|---|---|---|---|---|
| parts by weight of additives blended per 100 parts by weight of resin | | | | | | | | | | | |
| Compound A [I] | | | | 0.1 | 0.1 | | | | | | |
| Compound A [II] | 0.1 | | | | | | | | | | |
| Compound A [III] | | 0.1 | | | | | | | | | |
| Compound A [IV] | | | 0.1 | | | | | | | | |
| Phenolic anti-oxidant [I] | | | | | | | | | 0.1 | | |
| Phenolic anti-oxidant [II] | | | | | | 0.05 | 0.05 | 0.05 | 0.05 | 0.05 | 0.05 |
| Phenolic anti-oxidant [III] | 0.05 | 0.05 | 0.05 | | | | | | | | |
| Phenolic anti-oxidant [IV] | | | | 0.05 | | | | | | | |
| Phenolic anti-oxidant [V] | | | | | 0.05 | | | | | | |
| Radical generating agent [I] | | | | | | | | | | | |
| Radical generating agent [II] | 0.01 | 0.01 | 0.01 | 0.01 | 0.01 | 0.01 | 0.01 | 0.01 | | | |
| Phosphorus containing antioxidant 1 | | | | | | 0.05 | | | | 0.05 | |
| Phosphorus containing antioxidant 2 | | | | | | | 0.05 | | | | 0.05 |
| pentaerythritol tetrastearate | | | | | | | | 0.1 | | | |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.5 | 2.4 | 2.3 | 2.6 | 2.5 | 8.8 | 8.7 | 7.3 | 1.7 | 1.6 | 1.6 |
| MFR of pellets (g/10 min) | 21.2 | 22.1 | 21.6 | 23.5 | 23.8 | 22.3 | 22.5 | 22.9 | 6.7 | 6.7 | 6.7 |

TABLE 5

| | Specific example | | | | | | | | | | |
|---|---|---|---|---|---|---|---|---|---|---|---|
| | 65 | 66 | 67 | 68 | 69 | 70 | 71 | 72 | 73 | 74 | 75 |
| parts by weight of additives blended per 100 parts by weight of resin | | | | | | | | | | | |
| Compound A [I] | 0.1 | — | — | — | 0.1 | — | — | — | 0.1 | 0.1 | 0.1 |
| Compound A [II] | — | 0.1 | — | — | — | 0.1 | — | — | — | — | — |
| Compound A [III] | — | — | 0.1 | — | — | — | 0.1 | — | — | — | — |
| Compound A [IV] | — | — | — | 0.1 | — | — | — | 0.1 | — | — | — |
| Phenolic anti-oxidant [I] | 0.1 | 0.1 | 0.1 | 0.1 | 0.1 | 0.1 | 0.1 | 0.1 | — | — | — |
| Phenolic anti-oxidant [II] | 0.05 | 0.05 | 0.05 | 0.05 | 0.05 | 0.05 | 0.05 | 0.05 | 0.05 | 0.05 | — |
| Phenolic anti-oxidant [III] | — | — | — | — | — | — | — | — | — | — | 0.05 |
| Phenolic anti-oxidant [IV] | — | — | — | — | — | — | — | — | — | — | — |
| Phenolic anti-oxidant [V] | — | — | — | — | — | — | — | — | — | — | — |
| Radical generating agent [I] | 0.01 | 0.01 | 0.01 | 0.01 | — | — | — | — | — | — | — |
| Radical generating agent [II] | — | — | — | — | 0.01 | 0.01 | 0.01 | 0.01 | 0.01 | 0.01 | 0.01 |
| Phosphorus containing antioxidant 1 | — | — | — | — | — | — | — | — | 0.05 | — | — |
| Phosphorus containing antioxidant 2 | — | — | — | — | — | — | — | — | — | 0.05 | — |
| pentaerythritol tetrastearate | — | — | — | — | — | — | — | — | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.1 | 2.7 | 2.5 | 2.4 | 2.2 | 2.7 | 2.5 | 2.5 | 1.5 | 1.5 | 1.9 |
| MFR of pellets (g/10 min) | 4.4 | 4.4 | 4.5 | 4.5 | 5.2 | 5.3 | 5.4 | 5.5 | 5.5 | 5.6 | 5.6 |

| | Specific example | | | | | Comparative example | | | Referential example | | |
|---|---|---|---|---|---|---|---|---|---|---|---|
| | 76 | 77 | 78 | 79 | 80 | 13 | 14 | 15 | 13 | 14 | 15 |
| parts by weight of additives blended per 100 parts by weight of resin | | | | | | | | | | | |
| Compound A [I] | — | — | — | 0.1 | 0.1 | — | — | — | — | — | — |
| Compound A [II] | 0.1 | — | — | — | — | — | — | — | — | — | — |

TABLE 5-continued

| | | | | | | | | | | | |
|---|---|---|---|---|---|---|---|---|---|---|---|
| Compound A [III] | — | 0.1 | — | — | — | — | — | — | — | — | — |
| Compound A [IV] | — | — | 0.1 | — | — | — | — | — | — | — | — |
| Phenolic antioxidant [I] | — | — | — | — | — | — | — | — | 0.1 | — | — |
| Phenolic antioxidant [II] | | | | | | 0.05 | 0.05 | 0.05 | 0.05 | 0.05 | 0.05 |
| Phenolic antioxidant [III] | 0.05 | 0.05 | 0.05 | — | — | — | — | — | — | — | — |
| Phenolic antioxidant [IV] | — | — | — | 0.05 | — | — | — | — | — | — | — |
| Phenolic antioxidant [V] | — | — | — | — | 0.05 | — | — | — | — | — | — |
| Radical generating agent [I] | — | — | — | — | — | — | — | — | — | — | — |
| Radical generating agent [II] | 0.01 | 0.01 | 0.01 | 0.01 | 0.01 | 0.01 | 0.01 | 0.01 | — | — | — |
| Phosphorus containing antioxidant 1 | — | — | — | — | — | 0.05 | — | — | — | 0.05 | — |
| Phosphorus containing antioxidant 2 | — | — | — | — | — | — | 0.05 | — | — | — | 0.05 |
| pentaerythritol tetrastearate | — | — | — | — | — | — | — | 0.1 | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.6 | 2.4 | 2.5 | 2.4 | 2.5 | 9.5 | 9.5 | 7.9 | 1.8 | 1.6 | 1.7 |
| MFR of pellets (g/10 min) | 5.5 | 5.5 | 5.6 | 5.8 | 5.8 | 5.6 | 5.7 | 5.7 | 1.8 | 1.7 | 1.7 |

TABLE 6

| | Specific example | | | | | | | | | | |
|---|---|---|---|---|---|---|---|---|---|---|---|
| | 81 | 82 | 83 | 84 | 85 | 86 | 87 | 88 | 89 | 90 | 91 |
| parts by weight of additives blended per 100 parts by weight of resin | | | | | | | | | | | |
| Compound A [I] | 0.1 | — | — | — | 0.1 | — | — | — | 0.1 | 0.1 | 0.1 |
| Compound A [II] | — | 0.1 | — | — | — | 0.1 | — | — | — | — | — |
| Compound A [III] | — | — | 0.1 | — | — | — | 0.1 | — | — | — | — |
| Compound A [IV] | — | — | — | 0.1 | — | — | — | 0.1 | — | — | — |
| Phenolic antioxidant [I] | 0.1 | 0.1 | 0.1 | 0.1 | 0.1 | 0.1 | 0.1 | 0.1 | — | — | — |
| Phenolic antioxidant [II] | 0.05 | 0.05 | 0.05 | 0.05 | 0.05 | 0.05 | 0.05 | 0.05 | 0.05 | 0.05 | — |
| Phenolic antioxidant [III] | — | — | — | — | — | — | — | — | — | — | 0.05 |
| Phenolic antioxidant [IV] | — | — | — | — | — | — | — | — | — | — | — |
| Phenolic antioxidant [V] | — | — | — | — | — | — | — | — | — | — | — |
| Radical generating agent [I] | 0.01 | 0.01 | 0.01 | 0.01 | — | — | — | — | — | — | — |
| Radical generating agent [II] | — | — | — | — | 0.01 | 0.01 | 0.01 | 0.01 | 0.01 | 0.01 | 0.01 |
| Phosphorus containing antioxidant 1 | — | — | — | — | — | — | — | — | 0.05 | — | — |
| Phosphorus containing antioxidant 2 | — | — | — | — | — | — | — | — | — | 0.05 | — |
| pentaerythritol tetrastearate | — | — | — | — | — | — | — | — | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.3 | 2.9 | 2.6 | 2.5 | 2.3 | 2.9 | 2.8 | 2.9 | 1.8 | 1.9 | 2.2 |
| MFR of pellets (g/10 min) | 15.6 | 15.6 | 15.7 | 15.8 | 19.7 | 19.8 | 19.8 | 20.0 | 20.2 | 20.1 | 20.2 |

| | Specific example | | | | | Comparative example | | | Referential example | | |
|---|---|---|---|---|---|---|---|---|---|---|---|
| | 92 | 93 | 94 | 95 | 96 | 16 | 17 | 18 | 16 | 17 | 18 |
| parts by weight of additives blended per 100 parts by weight of resin | | | | | | | | | | | |
| Compound A [I] | — | — | — | 0.1 | 0.1 | — | — | — | — | — | — |
| Compound A [II] | 0.1 | — | — | — | — | — | — | — | — | — | — |
| Compound A [III] | — | 0.1 | — | — | — | — | — | — | — | — | — |
| Compound A [IV] | — | — | 0.1 | — | — | — | — | — | — | — | — |
| Phenolic antioxidant [I] | — | — | — | — | — | — | — | — | 0.1 | — | — |
| Phenolic antioxidant [II] | — | — | — | — | — | 0.05 | 0.05 | 0.05 | 0.05 | 0.05 | 0.05 |

TABLE 6-continued

| | | | | | | | | | | | |
|---|---|---|---|---|---|---|---|---|---|---|---|
| Phenolic antioxidant [III] | 0.05 | 0.05 | 0.05 | — | — | — | — | — | — | — | — |
| Phenolic antioxidant [IV] | — | — | — | 0.05 | — | — | — | — | — | — | — |
| Phenolic antioxidant [V] | — | — | — | — | 0.05 | — | — | — | — | — | — |
| Radical generating agent [I] | — | — | — | — | — | — | — | — | — | — | — |
| Radical generating agent [II] | 0.01 | 0.01 | 0.01 | 0.01 | 0.01 | 0.01 | 0.01 | 0.01 | — | — | — |
| Phosphorus containing antioxidant 1 | — | — | — | — | — | 0.05 | — | — | — | 0.05 | — |
| Phosphorus containing antioxidant 2 | — | — | — | — | — | — | 0.05 | — | — | — | 0.05 |
| pentaerythritol tetrastearate | — | — | — | — | — | — | — | 0.1 | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.7 | 2.6 | 2.7 | 2.8 | 2.9 | 9.9 | 10.0 | 8.2 | 1.9 | 1.8 | 1.9 |
| MFR of pellets (g/10 min) | 20.1 | 20.3 | 20.4 | 20.7 | 20.8 | 20.9 | 20.9 | 21.0 | 6.8 | 6.8 | 6.7 |

TABLE 7

| | Specific example | | | | | | | | | | |
|---|---|---|---|---|---|---|---|---|---|---|---|
| | 97 | 98 | 99 | 100 | 101 | 102 | 103 | 104 | 105 | 106 | 107 |
| parts by weight of additives blended per 100 parts by weight of resin | | | | | | | | | | | |
| Compound A [I] | 0.1 | — | — | — | 0.1 | — | — | — | 0.1 | 0.1 | 0.1 |
| Compound A [II] | — | 0.1 | — | — | — | 0.1 | — | — | — | — | — |
| Compound A [III] | — | — | 0.1 | — | — | — | 0.1 | — | — | — | — |
| Compound A [IV] | — | — | — | 0.1 | — | — | — | 0.1 | — | — | — |
| Phenolic antioxidant [I] | 0.1 | 0.1 | 0.1 | 0.1 | 0.1 | 0.1 | 0.1 | 0.1 | — | — | — |
| Phenolic antioxidant [II] | 0.05 | 0.05 | 0.05 | 0.05 | 0.05 | 0.05 | 0.05 | 0.05 | 0.05 | 0.05 | — |
| Phenolic antioxidant [III] | — | — | — | — | — | — | — | — | — | — | 0.05 |
| Phenolic antioxidant [IV] | — | — | — | — | — | — | — | — | — | — | — |
| Phenolic antioxidant [V] | — | — | — | — | — | — | — | — | — | — | — |
| Radical generating agent [I] | 0.01 | 0.01 | 0.01 | 0.01 | — | — | — | — | — | — | — |
| Radical generating agent [II] | — | — | — | — | 0.01 | 0.01 | 0.01 | 0.01 | 0.01 | 0.01 | 0.01 |
| Phosphorus containing antioxidant 1 | — | — | — | — | — | — | — | — | 0.05 | — | — |
| Phosphorus containing antioxidant 2 | — | — | — | — | — | — | — | — | — | 0.05 | — |
| pentaerythritol tetrastearate | — | — | — | — | — | — | — | — | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.4 | 2.9 | 2.5 | 2.6 | 2.5 | 2.8 | 2.9 | 2.8 | 1.6 | 1.7 | 2.1 |
| MFR of pellets (g/10 min) | 8.5 | 8.6 | 8.6 | 8.7 | 10.4 | 10.5 | 10.5 | 10.6 | 10.7 | 10.8 | 10.9 |

| | Specific example | | | | | Comparative example | | | Referential example | | |
|---|---|---|---|---|---|---|---|---|---|---|---|
| | 108 | 109 | 110 | 111 | 112 | 19 | 20 | 21 | 19 | 20 | 21 |
| parts by weight of additives blended per 100 parts by weight of resin | | | | | | | | | | | |
| Compound A [I] | — | — | — | 0.1 | 0.1 | — | — | — | — | — | — |
| Compound A [II] | 0.1 | — | — | — | — | — | — | — | — | — | — |
| Compound A [III] | — | 0.1 | — | — | — | — | — | — | — | — | — |
| Compound A [IV] | — | — | 0.1 | — | — | — | — | — | — | — | — |
| Phenolic antioxidant [I] | — | — | — | — | — | — | — | — | 0.1 | — | — |
| Phenolic antioxidant [II] | — | — | — | — | — | 0.05 | 0.05 | 0.05 | 0.05 | 0.05 | 0.05 |
| Phenolic antioxidant [III] | 0.05 | 0.05 | 0.05 | — | — | — | — | — | — | — | — |
| Phenolic antioxidant [IV] | — | — | — | 0.05 | — | — | — | — | — | — | — |

TABLE 7-continued

| | | | | | | | | | | | |
|---|---|---|---|---|---|---|---|---|---|---|---|
| Phenolic antioxidant [V] | — | — | — | — | 0.05 | — | — | — | — | — | — |
| Radical generating agent [I] | — | — | — | — | — | — | — | — | — | — | — |
| Radical generating agent [II] | 0.01 | 0.01 | 0.01 | 0.01 | 0.01 | 0.01 | 0.01 | 0.01 | — | — | — |
| Phosphorus containing antioxidant 1 | — | — | — | — | — | 0.05 | — | — | — | 0.05 | — |
| Phosphorus containing antioxidant 2 | — | — | — | — | — | — | 0.05 | — | — | — | 0.05 |
| pentaerythritol tetrastearate | — | — | — | — | — | — | — | 0.1 | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.5 | 2.6 | 2.5 | 2.7 | 2.8 | 9.9 | 9.8 | 8.2 | 1.9 | 1.6 | 1.8 |
| MFR of pellets (g/10 min) | 10.6 | 10.9 | 10.7 | 11.4 | 12.1 | 11.1 | 11.0 | 11.1 | 3.6 | 3.5 | 3.4 |

TABLE 8

| | Specific example | | | | | | | | | | |
|---|---|---|---|---|---|---|---|---|---|---|---|
| | 113 | 114 | 115 | 116 | 117 | 118 | 119 | 120 | 121 | 122 | 123 |
| parts by weight of additives blended per 100 parts by weight of resin | | | | | | | | | | | |
| Compound A [I] | 0.1 | — | — | — | 0.1 | — | — | — | 0.1 | 0.1 | 0.1 |
| Compound A [II] | — | 0.1 | — | — | — | 0.1 | — | — | — | — | — |
| Compound A [III] | — | — | 0.1 | — | — | — | 0.1 | — | — | — | — |
| Compound A [IV] | — | — | — | 0.1 | — | — | — | 0.1 | — | — | — |
| Phenolic antioxidant [I] | 0.1 | 0.1 | 0.1 | 0.1 | 0.1 | 0.1 | 0.1 | 0.1 | — | — | — |
| Phenolic antioxidant [II] | 0.05 | 0.05 | 0.05 | 0.05 | 0.05 | 0.05 | 0.05 | 0.05 | 0.05 | 0.05 | — |
| Phenolic antioxidant [III] | — | — | — | — | — | — | — | — | — | — | 0.05 |
| Phenolic antioxidant [IV] | — | — | — | — | — | — | — | — | — | — | — |
| Phenolic antioxidant [V] | — | — | — | — | — | — | — | — | — | — | — |
| Radical generating agent [I] | 0.01 | 0.01 | 0.01 | 0.01 | — | — | — | — | — | — | — |
| Radical generating agent [II] | — | — | — | — | 0.01 | 0.01 | 0.01 | 0.01 | 0.01 | 0.01 | 0.01 |
| Phosphorus containing antioxidant 1 | — | — | — | — | — | — | — | — | 0.05 | — | — |
| Phosphorus containing antioxidant 2 | — | — | — | — | — | — | — | — | — | 0.05 | — |
| pentaerythritol tetrastearate | — | — | — | — | — | — | — | — | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.3 | 2.7 | 2.6 | 2.5 | 2.6 | 2.8 | 2.5 | 2.6 | 1.7 | 1.5 | 2.2 |
| MFR of pellets (g/10 min) | 16.1 | 16.3 | 16.4 | 16.5 | 20.3 | 20.4 | 20.6 | 21.1 | 21.2 | 21.4 | 21.8 |

| | Specific example | | | | | Comparative example | | | Referential example | | |
|---|---|---|---|---|---|---|---|---|---|---|---|
| | 124 | 125 | 126 | 127 | 128 | 22 | 23 | 24 | 22 | 23 | 24 |
| parts by weight of additives blended per 100 parts by weight of resin | | | | | | | | | | | |
| Compound A [I] | — | — | — | 0.1 | 0.1 | — | — | — | — | — | — |
| Compound A [II] | 0.1 | — | — | — | — | — | — | — | — | — | — |
| Compound A [III] | — | 0.1 | — | — | — | — | — | — | — | — | — |
| Compound A [IV] | — | — | 0.1 | — | — | — | — | — | — | — | — |
| Phenolic antioxidant [I] | — | — | — | — | — | — | — | — | 0.1 | — | — |
| Phenolic antioxidant [II] | — | — | — | — | — | 0.05 | 0.05 | 0.05 | 0.05 | 0.05 | 0.05 |
| Phenolic antioxidant [III] | 0.05 | 0.05 | 0.05 | — | — | — | — | — | — | — | — |
| Phenolic antioxidant [IV] | — | — | — | 0.05 | — | — | — | — | — | — | — |
| Phenolic antioxidant [V] | — | — | — | — | 0.05 | — | — | — | — | — | — |
| Radical generating agent [I] | — | — | — | — | — | — | — | — | — | — | — |
| Radical generating agent [II] | 0.01 | 0.01 | 0.01 | 0.01 | 0.01 | 0.01 | 0.01 | 0.01 | — | — | — |

TABLE 8-continued

| ating agent [II] | | | | | | | | | | | |
|---|---|---|---|---|---|---|---|---|---|---|---|
| Phosphorus containing antioxidant 1 | — | — | — | — | — | 0.05 | — | — | — | 0.05 | — |
| Phosphorus containing antioxidant 2 | — | — | — | — | — | — | 0.05 | — | — | — | 0.05 |
| pentaerythritol tetrastearate | — | — | — | — | — | — | — | 0.1 | — | — | — |
| Ca-St | 0.1 | 0.1 | 0.1 | 0.1 | 0.1 | 0.1 | 0.1 | 0.1 | 0.1 | 0.1 | 0.1 |
| YI of pellets (%) | 2.8 | 2.6 | 2.6 | 2.9 | 2.8 | 10.1 | 9.9 | 8.5 | 1.9 | 1.8 | 1.9 |
| MFR of pellets (g/10 min) | 21.3 | 22.1 | 21.7 | 23.4 | 24.0 | 22.1 | 22.4 | 23.1 | 6.8 | 6.8 | 6.8 |

The Specific examples, the Comparative examples and the Referential examples in Table 1 are directed to the case in which a propylene homopolymer is used as the propylene polymer. As is evident from Table 1, in Specific examples 1–16, compound A, a phenolic antioxidant and a radical generating agent are blended with a propylene homopolymer containing 30 ppm of a titanium catalyst residue, followed by a melting and kneading treatment.

If Specific examples 1–16 are compared with Comparative Examples 1–2, Specific examples 1–16 show that the product has much less coloring. It is seen that Comparative examples 1–2, in which a phosphorous-containing antioxidant is used in place of a compound A, results in a product with notable coloring. If Comparative example 3, in which a perfect ester of a polyol with a fatty acid is used in place of a compound A, is compared with Specific examples 1–16, Comparative example 3 improves to a certain extent the coloring property, but its improvement is still insufficient. Further, if Specific examples 9–10, in which a compound A, a phenolic antioxidant, a radical generating agent are used in accordance with the present invention, and blended with a phosphorus containing antioxidant and melting and kneading treatment is carried out, is compared with Specific example 5, it is evident that the superior color preventing effect of a compound A is not hindered and a notable synergistic effectiveness obtained by the simultaneous use of a phosphorus-containing compound. Further, in Referential examples 1–3 in which no radical generating agent is used, no notable coloring occurs as is evident by a comparison with Comparative examples 1–2. It can be said then that the above-mentioned noticeable coloring is a special phenomenon observable at the time of melting and kneading treatment carried out in the presence of a radical generating agent.

Further in Examples 1–16 and Comparative examples 1–3 in which treatment of melting and kneading was carried out by using a radical generating agent, it is seen that the shaping and fabricating property is improved in each case. In contrast, in Referential examples 1–3 in which treatment of melting and kneading is carried out without using a radical generating agent, it can be seen that the melting and shaping property is quite low.

However, a modified propylene polymer composition obtained according to the production process of the present invention does not show coloring and provides improvement in the shaping and fabricating property.

Tables 2–4 relate to cases in which crystalline ethylene-propylene random copolymer, crystalline ethylene-propylene block copolymer and crystalline ethylene-propylene-butene-1 terpolymer are used. The same effectivenesses as those mentioned above were confirmed with regard to these cases also.

The Specific examples and Comparative examples described in Table 5, relate to the cases in which propylene homopolymer was the propylene polymer used. As is evident from Table 5, Specific examples 65–80 relate to the case in which a propylene homopolymer containing 0.6 ppm of vanadium in the catalyst residue is blended with a compound A, a phenolic antioxidant and a radical generating agent, and subjected to melting and kneading treatment. If Specific examples 65–80 are compared with Comparative examples 13–15, it is seen that the products of Specific examples 65–80 exhibit less coloring, and the products of Comparative examples 13–14 in which a phosphorus-containing antioxidant was used in place of a compound A show notable coloring. If Comparative example 15, in which a perfect ester of a polyol with a fatty acid is used in place of a compound A, is compared with Specific examples 65–80, Comparative example 15 shows some improvement in coloring properties but its improvement is not really satisfactory. Further, it is seen that in Specific examples 73–74 in which a compound A, a phenolic antioxidant, a radical generating agent and a phosphorus-containing antioxidant are blended, and a melting and kneading treatment carried out thereafter, is not detrimental to achieve superior coloring properties of the compound A as compared with Specific example 69 and a notable synergistic effect due to the simultaneous use of a phosphorus containing antioxidant is recognizable. Further the products of Referential examples 13–15, in which melting and kneading treatment are carried out without using a radical generating agent do not show notable coloring, as evident from the comparison with the products of Comparative examples 13–14. It can be seen that the above-mentioned notable coloring is a specific phenomenon observable at the time of melting and kneading treatment carried out in the presence of a radical generating agent.

Tables 6–8 are directed to the cases in which crystalline ethylene-propylene random copolymer, crystalline ethylene-propylene block copolymer and crystalline ethylene-propylene-1 terpolymer are used as the propylene polymer. With regard to these materials the same effectiveness mentioned above are confirmed.

It is evident that the products obtained in accordance with the production process of the present invention shows minimal coloring and have an improved shaping and fabricating property.

From the foregoing it is clear that the modified propylene polymer compositions obtained according to the production process of the present invention have a much better ability to prevent coloring as compared with modified propylene polymer compositions obtained by blending compounds which have heretofore been known to prevent color after subjecting to melting and kneading treatment in the presence of a radical generating agent.

What we claim is:

1. The method which comprises
   (1) blending 100 parts by weight of a high catalyst residue propylene polymer containing at least 5 ppm of titanium in the form of a catalyst residue or at least 0.5 ppm vanadium in the form of a catalyst residue with
      (a) 0.014–1 parts by weight of a polyol or a partial ester of a polyol with a fatty acid,
      (b) 0.01–1 parts by weight of a phenolic antioxidant, and
      (c) 0.001–0.5 parts by weight of a radical generating agent, and
   (2) subjecting said blend to melting and kneading at a temperature of 150° C.–300° C.

2. A method according to claim 1 wherein (a) is trimethylolethane, a monoester of glycerine with a fatty acid, a monoester of pentaerythritol with a fatty acid, or a diester of pentaerythritol with a fatty acid.

3. The method of claim 1 in which said phenolic antioxidant is 2,6-di-t-butyl-p-cresol, tetrakis[methylene-3-(3′,5′-di-t-butyl-4′-hydroxyphenyl)propionate] methane, 1,3,5-tris (3,5-di-t-butyl-4-hydroxybenzyl)-isocyanurate or noctadecyl-beta-(4′-hydroxy-3′,5′-di-6-butylphenyl)propionate.

4. The method of claim 1 in which said radical generating agent is 2,5-di-methyl-2,5-di-(t-butyl peroxy) hexane-2,5-dimethyl-2,5-di-(t-butyl peroxy)hexyne-3 or 1,3-bis-(6-butyl peroxy isopropyl)benzene.

5. The method of claim 1 in which said propylene polymer is propylene homopolymer, crystalline ethylene-propylene random copolymer, crystalline ethylene-propylene block copolymer, crystalline propylene-butene-1 random copolymer or crystalline ethylene-propylene-butene-1, terpolymer.

6. A method according to claim 1 wherein said propylene polymer is selected from the group consisting of propylene homopolymers and crystalline copolymers of propylene.

7. The method which comprises
   (1) blending 100 parts by weight of a propylene polymer containing at least 5 ppm of titanium in the form of a catalyst residue or at least 0.5 ppm vanadium in the form of a catalyst residue, said propylene polymer being selected from the group consisting of a propylene homopolymer, a crystalline ethylene-propylene random copolymer, a crystalline ethylene-propylene block copolymer, a crystalline propylene-butene-1 random copolymer and a crystalline ethylene-propylene-butene-1, terpolymer, with
      (a) 0.01–1 parts by weight of either a trimethylolethane, a monoester of glycerine with a fatty acid, a monoester of pentaerythritol with a fatty acid or a diester of pentaerythritol with a fatty acid, and
      (b) 0.01–1 parts by weight of a phenolic antioxidant, selected from the group consisting of 2,6-di-t-butyl-op-cresol, tetrakis[methylene-3-(3′,5′-di-t-butyl-4′-hydroxyphenyl)propionate] methane, 1,3,5-trimethyl- 2,4,6-tris(3,5-di-t-butyl-4-hydroxybenzyl)-benzene, 1,3,5-tris(3,5-di-t-butyl-4-hydroxybenzyl)-isocyanurate and n-octadecyl-beta-(4′hydroxy-3′,5′-di-t-butylphenyl) propionate, and
   (2) subjecting said blend to melting and kneading at a temperature of 150° C.–300° C.

8. A method according to claim 1 wherein said melting and kneading treatment temperature is 180°–270° C.

9. A method according to claim 1 wherein a phosphorous-containing antioxidant is also added to the blend.

10. The product produced according to the method of claim 1.

11. The product produced according to the method of claim 2.

12. The product produced according to the method of claim 3.

13. The product produced according to the method of claim 4.

14. The product produced according to the method of claim 5.

15. The product produced according to the method of claim 6.

16. The product produced according to the method of claim 7.

17. The product produced according to the method of claim 8.

18. The product produced according to the method of claim 9.

19. A method according to claim 1 wherein (a) is glycerin monostearate.

20. The product produced according to the method of claim 19.

* * * * *